United States Patent
Bencak et al.

(10) Patent No.: US 9,235,249 B2
(45) Date of Patent: Jan. 12, 2016

(54) POWER CONTROL FOR SERIAL BUS PERIPHERAL DEVICE

(75) Inventors: Daniel Bencak, Dortmund (DE); Thomas Block, Wuppertal (DE); Sten Carlsen, Taastrup (DK); Jani Heikkinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1355 days.

(21) Appl. No.: 12/516,719

(22) PCT Filed: Nov. 30, 2006

(86) PCT No.: PCT/IB2006/003421
§ 371 (c)(1),
(2), (4) Date: Oct. 22, 2009

(87) PCT Pub. No.: WO2008/065468
PCT Pub. Date: Jun. 5, 2008

(65) Prior Publication Data
US 2010/0037074 A1    Feb. 11, 2010

(51) Int. Cl.
*G06F 1/26* (2006.01)
*G06F 1/32* (2006.01)

(52) U.S. Cl.
CPC .............. *G06F 1/3203* (2013.01); *G06F 1/266* (2013.01); *G06F 1/3253* (2013.01); *Y02B 60/1235* (2013.01)

(58) Field of Classification Search
CPC ..... G06F 1/266; G06F 1/3203; G06F 1/3206; G06F 2213/0042
USPC .................................................. 713/300, 320
See application file for complete search history.

(56) References Cited

U.S. PATENT DOCUMENTS

| | | | |
|---|---|---|---|
| 6,105,097 A | 8/2000 | Larky et al. | |
| 6,397,339 B1 * | 5/2002 | Terazawa | 713/300 |
| 6,963,986 B1 | 11/2005 | Briggs et al. | |
| 2003/0054703 A1 * | 3/2003 | Fischer et al. | 439/894 |
| 2004/0073819 A1 * | 4/2004 | Sekine et al. | 713/300 |
| 2004/0239294 A1 * | 12/2004 | Veselic et al. | 320/155 |
| 2005/0091549 A1 | 4/2005 | Wu et al. | |
| 2006/0053318 A1 | 3/2006 | One | |
| 2006/0136757 A1 * | 6/2006 | Chen et al. | 713/300 |
| 2007/0035276 A1 * | 2/2007 | Webjorn | 320/114 |
| 2008/0104422 A1 * | 5/2008 | Mullis et al. | 713/300 |

OTHER PUBLICATIONS

International Search Report and the Written Opinion of the International Searching Authority, received in corresponding PCT Application No. PCT/IB2006/003421, Dated Jul. 20, 2007, 9 pages.
Office Action from corresponding Chinese Patent Application No. 200680056865.3, dated Nov. 9, 2010, 9 pages.
Office Action from corresponding Korean Patent Application No. 520000368439, dated Jan. 24, 2011, 4 pages.

* cited by examiner

*Primary Examiner* — Kim Huynh
*Assistant Examiner* — Brandon Kinsey
(74) *Attorney, Agent, or Firm* — Locke Lord LLP

(57) ABSTRACT

There is disclosed a method and a device connected to a serial bus, said method comprising transmitting a message that indicates a power requirement for a suspended mode of said serial bus; in response to a received authorization message, setting a first or a second operating state; entering said suspended mode; drawing a current in accordance with said indicated power requirement that may exceed a predetermined current limit if said operating state is said first state, and drawing a current at or below said predetermined current limit if said operating state is said second state.

20 Claims, 4 Drawing Sheets

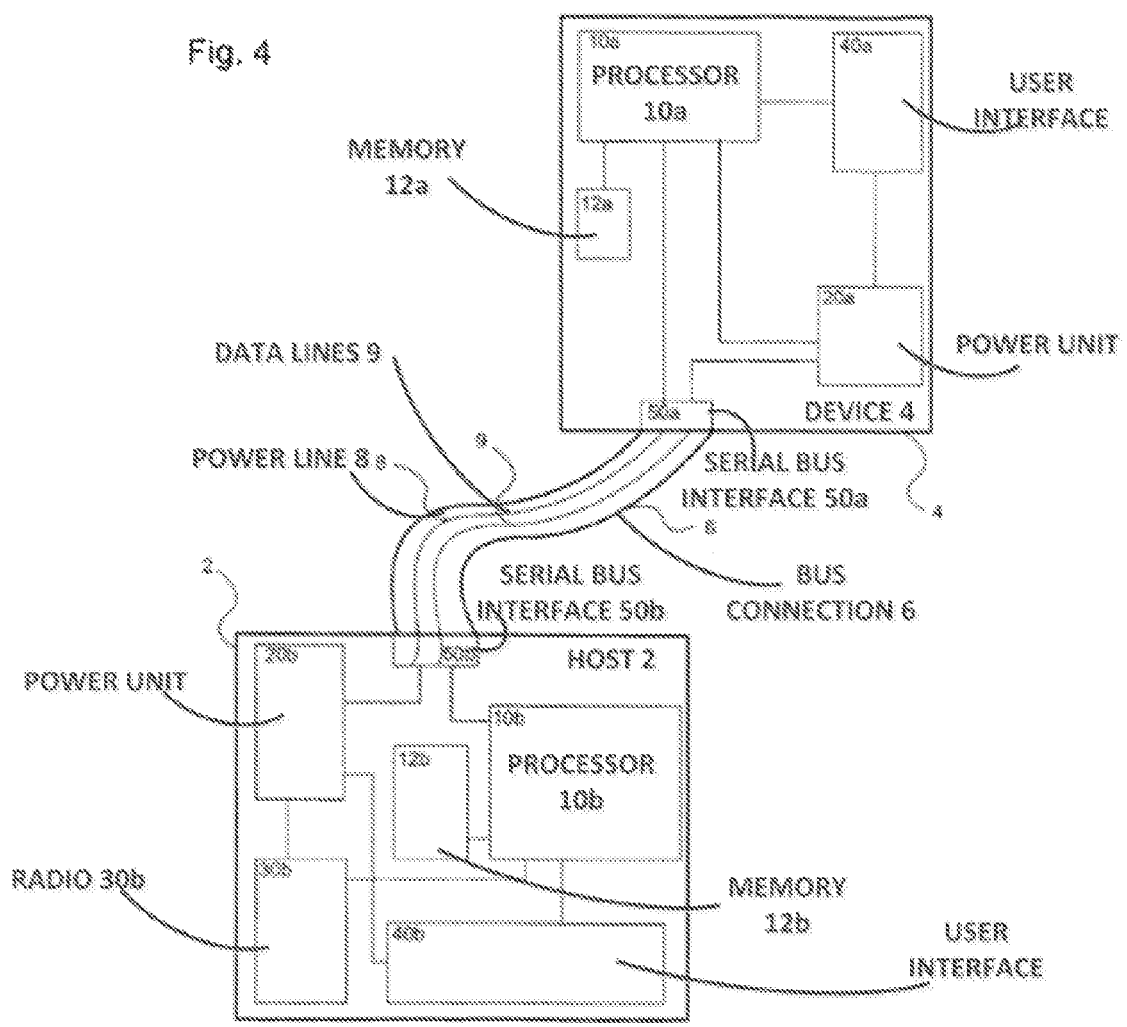

POWER CONTROL FOR SERIAL BUS PERIPHERAL DEVICE

RELATED APPLICATION

This application was originally filed as PCT Application No. PCT/IB2006/003421 filed Nov. 30, 2006.

FIELD OF THE INVENTION

This invention is related to the field of power control, and more specifically to power control in a suspended mode of a serial bus connection.

RELATED ART

Many electronic devices are arranged to be connected to another device, such as a personal computer, laptop computer, or a printer, for data communication. Some examples for such electronic devices are handheld computers, digital cameras, media players, or mobile phones. The connection to a PC or some other device is frequently effected via a serial data communication bus.

A serial data bus interface usually includes at least one data line, a ground line and a power line. Additional pins and lines may be present. In most cases, a device is allowed to draw power from the power line on the interface. One purpose of this power supply is that devices with limited power consumption would not need to have an additional power supply for operation with a host device. One example is the Universal Serial Bus (USB) standard. The USB standard specifications define how much power may be consumed by a device and under what conditions power may be drawn. Usually, a specific connection procedure compliant with a respective standard is required before the serial bus can be used for data communication or for supplying power.

As many devices, as mentioned above, use a battery or rechargeable battery as a mobile power source, power consumption is an important design consideration. The power supplied on a serial data bus might for example be used to recharge a battery or to power some components of a device, utilizing the same interface and connection that are used for data communication through the bus. Mobile devices having only limited power supply (in the form of e.g. a rechargeable battery) are particularly in need for power saving methods to achieve an operating time as long as possible without having to dispense with any device features.

In the example of the Universal Serial Bus, current is supplied from the host to the device through an interface power line: Vbus. The maximum current that is supplied by the host, and that a device is allowed to draw from Vbus, is preset and depends on the current operating mode of the device and the associated host. Several modes or operating states are defined that a device may assume, each having specified configurations such as power limitations.

When serial bus communication is not needed, the bus may enter a suspended mode. With USB as an example, a device will enter this mode when no bus activity is detected for more than 3 ms. Power consumption is limited in USB suspend mode to 500 AA current draw per unit load, that is, to a maximum of 2.5 mA for a high-powered device (five unit loads). This means that a device in suspended mode is not guaranteed enough power via the bus connection for maintaining any power consuming features, but rather has to resort to its own internal power supply during suspended mode. If there is no internal supply or if it is not sufficiently charged, features may even have to be deactivated in order to enable the suspended mode in a device. On the other hand, it is usually economical to enter suspended mode and thus deactivate those parts of a device which are concerned with bus communication when they are not needed at all. Also, when a device is charging using the USB power line, it would have to stop charging when the bus is suspended by the host.

SUMMARY

A method is provided that may in exemplary embodiments comprise: transmitting, by a device connected to a serial bus, a message that indicates a power requirement for a suspended mode of said serial bus; in response to a received authorization message, setting a first or a second operating state; entering said suspended mode; drawing a current in accordance with said indicated power requirement that may exceed a predetermined current limit if said operating state is said first state, and drawing a current at or below said predetermined current limit if said operating state is said second state.

The method may further comprise receiving a disable message; and setting said second operating state in response to said disable message. This allows the host to disable the increased power mode at any time when necessary and instructs the device to comply with the normal current limits for the serial bus in suspend mode.

In some embodiments, the method may further comprise setting said second operating state in response to a bus reset, and/or setting said second operating state in response to a disconnection of said device from said serial bus.

Optionally, it may include transmitting a confirmation message in response to said disable message or said authorization message. In this way, the host is informed that the device may or will in fact draw increased power.

The operating state may in some embodiments be stored in a hardware-based or software-based state machine. When the authorization from the host is received, this operating state may be stored, and subsequently be read from the state machine or register when suspended mode is entered to determine whether additional power may be drawn.

In exemplary embodiments, the messages are transmitted via said serial bus.

The serial bus may for example be operated according to the USB standard, which is one of the most common serial bus standards for electronic consumer devices.

The predetermined current limit may in some embodiments be 2.5 mA. This is the power limit given by the USB specification for suspend mode.

In exemplary embodiments, said suspended mode is entered in response to a predetermined suspend condition. Such a condition may be a predetermined period of time without any bus activity, as it is defined in USB; but other events or signals are equally conceivable for activating suspended mode.

Furthermore, a computer program product comprising computer code sections adapted to perform any of the above steps when executed on a processing unit is provided.

BRIEF DESCRIPTION OF FIGURES

In the following, exemplary embodiments of the invention will be described in more detail with reference to the appended figures, wherein

FIG. 4 shows schematically an exemplary device and host connected via a serial bus connection.

It is explicitly stated that any features shown in the figures are by way of example only and not intended to limit the inventive scope. Further elements and details may be present that are not shown.

DETAILED DESCRIPTION OF EXEMPLARY EMBODIMENTS

Exemplary embodiments of the invention are presented of a method for decreasing internal power consumption of a device. Messages exchanged between a host and connected peripheral device may be used for enabling an operating mode where more current may be drawn from the host as actually intended while in suspended mode.

For the purpose of this description, the term "increased power consumption mode" will refer to an operating mode that allows a device 4 to draw more power from the power supply of a serial bus interface than actually specified or usually allowed in a suspended mode on the interface. "Suspended mode" refers to an operating mode where no serial bus communication is present and thus at least some device/host functionalities may be deactivated and/or operate in a low power mode.

Using USB suspended mode as an example, the specified allowed current drain for a device in suspended mode is 2.5 mA at most. If the increased power consumption mode as defined above is enabled for a device, the current drawn from the interface may exceed this limit of 2.5 mA when in suspended mode. While USB is cited as an example for explaining the inventive idea, the inventive idea applies to other serial bus communication interfaces utilizing a standby or suspended mode with limited current drain as well.

Figure 1:
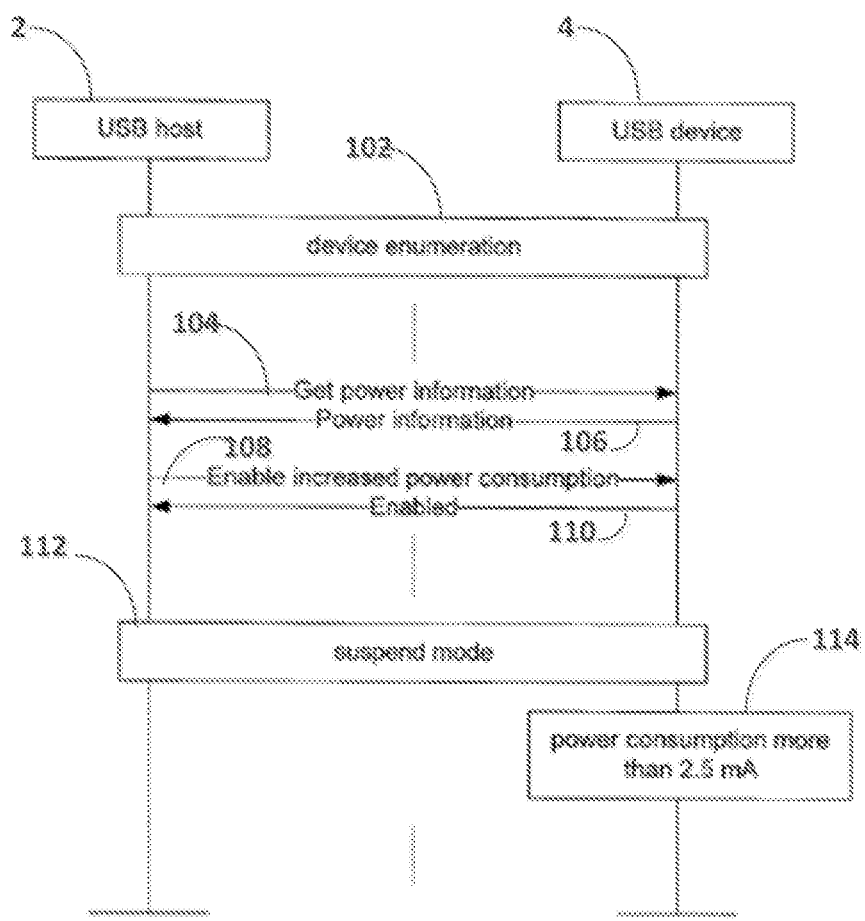
FIG. 1 illustrates a message sequence for enabling increased power consumption mode.
Figure 2:
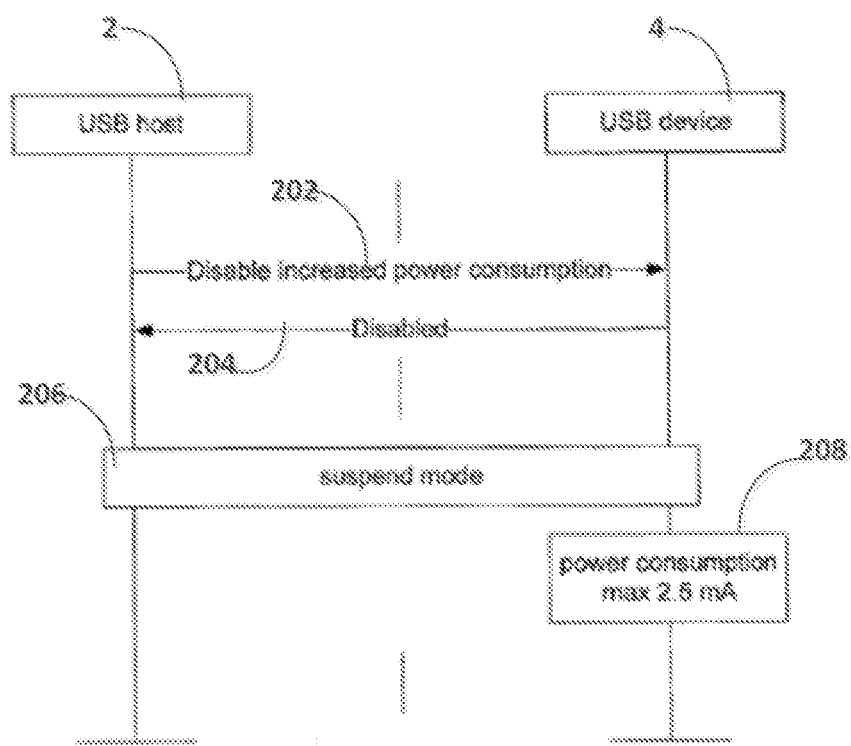
FIG. 2 illustrates a message sequence for disabling increased power consumption mode.
Figure 3:
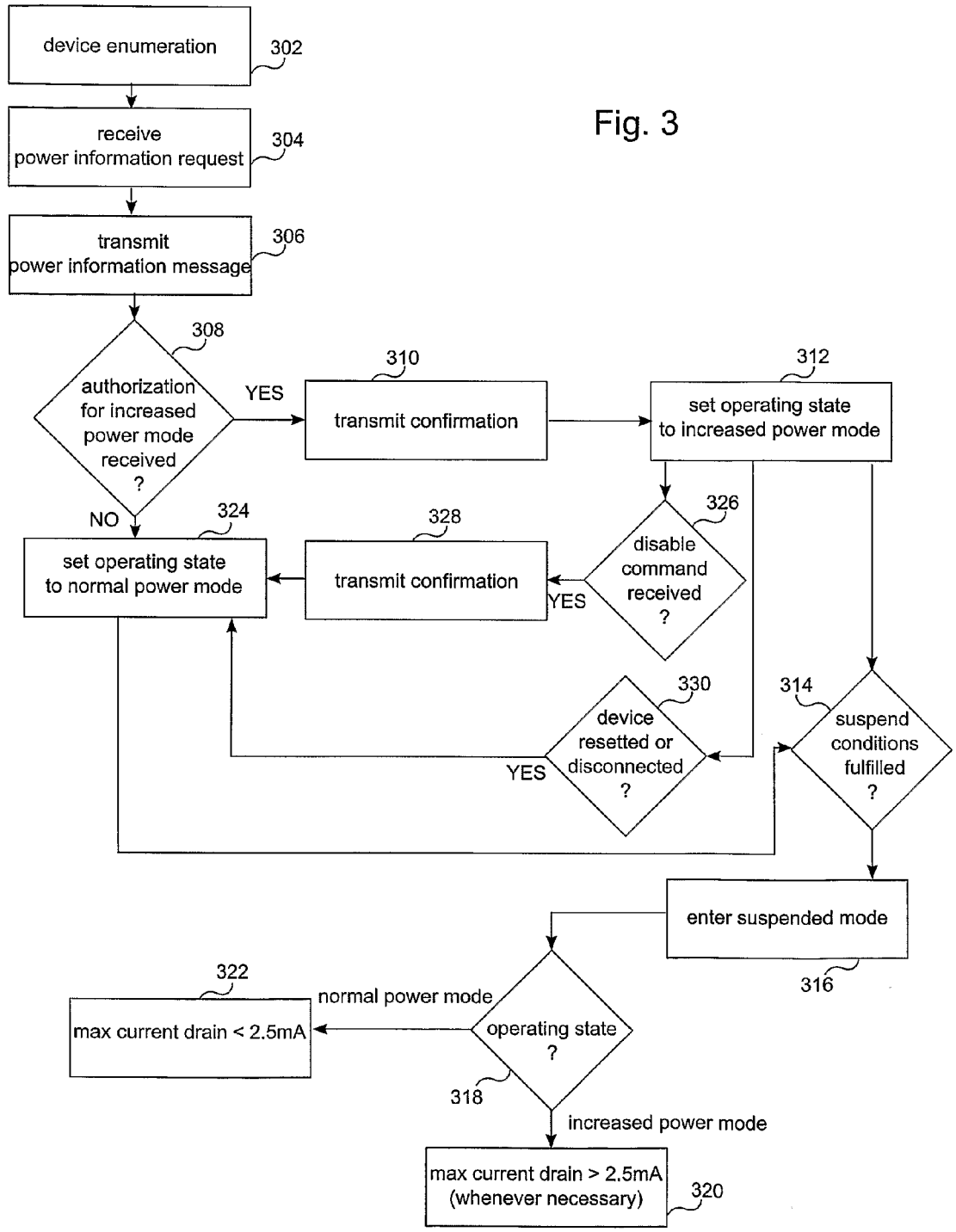
FIG. 3 shows exemplary method steps performed in a device.

In the following, several steps of an exemplary method are outlined. FIGS. 1 and 2 show sequence diagrams for further illustration of messages transmitted and functions performed. The method steps executed in a device are illustrated by way of example in the flow diagram of FIG. 3.

When a device 4 is attached to an USB host 2, it first has to enumerate (step 302 of FIG. 3) with the host 2 to enable full bus communication. The exact enumeration procedure 102 is specified e.g. in the USB standard, Revision 2.0 from 27 Apr., 2000, available through www.usb.org, and included by reference. After enumeration, the host may request power information from the connected device. For this purpose a request message 104 (see FIG. 1 for messages used in the mode enable sequence) may be used. The device will receive (step 304) the request and determine its current power requirements. Optionally, the determination of power requirements may also take into consideration any components that are not currently being used, but might be used at a later time; or alternatively, power requirements could be preset and stored in the device. In any case, the device may then respond to the request in step 306 with a power information message 106. In this message, the maximum current needed may be specified. In some embodiments, the message may indicate whether the device requires an increased current consumption during a suspended mode that would exceed the current limit of 2.5 mA.

The host may then determine whether it is capable of supplying the desired current in suspended mode. If it is, it may allow the increased power consumption mode for the device by a further message 108 that is again sent to the device via bus signalling. If needed, it enables an increased power supply at this time. If the host does not support an increased current draw in suspended mode, either at that time or always, it may transmit a rejection message to inform the device that it is not allowed to draw more current than originally specified for suspended mode. Alternatively, it may not respond to the message 106 at all, which may also indicate a rejection to the device and thus result in the device not drawing more current than generally allowed, that is, for the USB example it would comply with the USB specification.

After the device received (step 308) an enable message 108 for an increased power mode, it may draw more current than usually allowed in suspended mode 112. Optionally, the mode enabling may first be acknowledged by the device by means of an enable confirmation message 110 transmitted to the host in step 310. The device does not necessarily have to draw the maximum allowed amount of current. In practice, the device may in response to the received authorization and/or the returned confirmation set a certain operating state (step 312) that indicates the increased power mode. This may for example be done by setting a flag or a bit in a status register, which may thus indicate a first or second operating state, corresponding to an enabled or disabled increased power consumption mode.

Typically, some conditions have to be fulfilled (step 314) that result in a suspended mode. For the case of USB, the bus is suspended when there is no bus activity detected for a period of more than 3 ms; but other conditions may be used similarly.

Suspended mode is not necessarily activated directly after the discussed message sequence for authorization of an increased power mode. The authorization messages may for example be exchanged directly after enumeration. Then, suspended mode could be entered by the device at any time as required, and sufficient current could still be drawn in suspended mode, since the host already enabled the increased power mode before. As mentioned above, a software or hardware based state machine may be used to store the current operating state (enabled or disabled increased power mode), which can then be retrieved in step 318 when entering suspended mode. After reading the current operating state, the device may either draw a current at or below the usually defined current limit in suspended state, such as a maximum of 2.5 mA (step 322), or, if the operating state flag shows that increased power mode is allowed, it may draw more current when necessary (step 320). The maximum current drain in increased power mode could e.g. be defined in one of the exchanged messages, such as the enable message received from the host, or could be predetermined. In some embodiments, no power requirements or limits may be given in the messages at all, such that a device and host will assume that the current requirement for suspended mode is the same as in normal operating mode.

In further embodiments, the message sequence might be exchanged at a later point, or e.g. in response to a specific event, such as the beginning of a charge cycle by the device. In that case the device might alternatively indicate the increased power requirement to the host (as in step 306) without receiving any previous power information request.

The suspend mode of the bus and the power consumption of the device in this mode is also indicated in the message sequence diagrams of FIGS. 1 and 2. After the enable message (108 of FIG. 1) and an corresponding confirmation (110), suspended mode 112 could be entered at any time. The dots shown between some sequences such as between enumeration 102 and power information 104, shall indicate that any arbitrary further steps, sequences and procedures may occur in between. As the increased power mode was enabled by messages 108 and 110, power consumption may then be more than 2.5 mA in suspended mode, as indicated in step 114.

The host may at any time disable the increased power consumption mode. For this purpose, it may transmit (step 326) a disable message 202 (cf. FIG. 2 for disable message sequences) to the device, which should then respond with a corresponding disable confirmation 204 to the host in step 328. When the device enters a suspended mode (step 316 in FIG. 3/206 in FIG. 2) after the increased power consumption mode has been disabled (i.e. set back to normal mode) in step 324, it will again only draw the amount of current specified for suspended mode and not more (2.5 mA for USB) (step 322/208).

If the device is disconnected from the host or hub, the increased power consumption mode may be automatically disabled, and also if the bus is reset via a standard bus reset (step 330). These disable procedures do not require any messages to be transmitted between host and device. When a device is then again in bus communication after the reset or after reattachment, another authorization procedure as described above would be required before the device may again draw increased power during suspended mode.

The default operating state for a device should be such that increased power consumption is disabled, that is, normal operating state. This allows devices to pass any certification tests that require the device to comply with current limits in suspended mode, as it is the case for USB devices. All messages and commands discussed above may be defined as vendor specific messages and commands.

A device 4 using a method such as in the example described and shown schematically in FIG. 4 may e.g. be a mobile communication device, an accessory device for another device such as a headset with extended functionality, a camera, a handheld or desktop computer, and many more. The host 2 would then for example be another computer or mobile computing/communication device, or a serial hub connected to a further device. The serial bus interface 50a, 50b (e.g. USB) and the serial bus connection 6 connecting device 4 and host 2 may include a power line 8 and several data lines 9. A device or host may for example include a processor or controller 10a, 10b, a memory unit 12a, 12b, a radio unit 30a, 30b, a user interface 40, various interfaces or inputs/outputs for data communication with further devices (not shown), and a power supply unit 20a, 20b. The processor 10 may be capable of performing certain functions and executing computer programs, which may be stored on a memory unit 12. The memory unit 12 could be used to store any data incurring during operation, such as variables, program code, flags, input data, measurement data, or any other kind of storable information. It may be implemented e.g. as a volatile or non-volatile memory unit such as a flash memory, or a removable storage unit such as a memory card. The radio unit 30, which may e.g. be present in a communication device, may include transmission unit(s), antenna(s), signal processor(s) such as analog-digital-converters or coding elements, and many more. A user interface 40 may be present that may be implemented in a wide variety of ways, depending on the function of a device. For example, the user interface 40 of a mobile communication unit may include a keypad, keyboard, cursor element, or any further known user input means, while a headset may e.g. have buttons, wheels or similar elements to control volume and function of the headset. Also, visual user interface elements may be included, such as a display for text of any size, or illuminated elements such as LEDs to indicate a status. Of course, audio elements may be equally provided, such as head phones on a head set (and e.g. a microphone for speech input) or a speaker for audio output and signalling. Power may be provided and controlled by a power unit 20 which may e.g. comprise an internal power source such as a rechargeable or non-rechargeable battery and/or an interface for an external power source, and a control element to control the power provided to various elements. In view of the above description, power may for example be provided via the power line of the serial bus interface, and a battery may in an exemplary embodiment be included optionally for backup power supply.

Device 4, host 2 and serial bus connection 6 may all include further elements, connections and functions which are not shown and/or described in this specification, or some of the described elements may be absent or combined and connected in a different way, depending on the desired functionality and application. "Device" and "host" are to be understood as functional terms in view of a serial bus communication and do not allow any further conclusions regarding the elements included in such apparatus. That is, the examples devices 2,4 and their elements of FIG. 4 may also be interchanged. The person skilled in the art will be aware of many other implementations and device elements that may be integrated in connection with the invention.

Some embodiments of the invention may for instance be used with a mobile communication device such as a cellular phone and a headset having radio functionality. Both host and device (i.e. phone and headset in this example) may include a serial bus interface such as an USB interface and may thus be connected via this interface, either directly or by an additional connection cable. When the phone would suspend the USB bus, this would mean that usually no current above 2.5 mA may be drawn and therefore any advanced functionality such as the radio functionality cannot be used when the bus is suspended. Using an increased power consumption mode as described here, the headset may at some point after enumeration request this mode by indicating its power requirement for suspended mode as described above in detail. If sufficient current is available from the host, i.e. the phone in this case, it may enable the increased power mode. Then, the device (headset) may continue to drive the additional radio functionality in suspended mode, as the required current may be drawn from the USB interface even when suspended, i.e. even when USB communication is deactivated.

It is understood that some of the steps described in the examples could be left out or replaced by other steps. Also, the order of steps could be modified; for example, a confirmation message might be transmitted before setting the operating state.

Although exemplary embodiments of the present invention have been described, these should not be construed to limit the scope of the appended claims. Those skilled in the art will understand that various modifications may be made to the described embodiments and that numerous other configurations or combinations of any of the embodiments are capable of achieving this same result. Moreover, to those skilled in the various arts, the invention itself will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

The invention claimed is:

1. A method comprising:
    participating in an enumeration process in a message exchange to enable bus communication between a host and a device;

after completing the enumeration process, determining by the device to transmit a message on a serial bus that indicates a serial bus suspended mode power requirement;
receiving an authorization message for power;
in response to the received authorization message, determining to set an increased power mode operating state or a normal power mode operating state;
determining to, where the increased power mode operating state is set, enter an increased power suspended mode;
determining to, where the normal power mode operating state is set, enter a normal power suspended mode;
determining to draw, while in the increased power suspended mode, a current in accordance with the indicated power requirement that may exceed a predetermined current limit; and
determining to draw, while in the normal power suspended mode, a current at or below the predetermined current limit.

2. The method according to claim 1, further comprising:
receiving a disable message; and
determining to set the normal power mode operating state in response to the disable message.

3. The method according to claim 2, further comprising:
determining to transmit a confirmation message in response to the disable message.

4. The method according to claim 1, further comprising:
determining to set the normal power mode operating state in response to a bus reset.

5. The method according to claim 1, further comprising:
determining to set the normal power mode operating state in response to a disconnection of an apparatus from the serial bus.

6. The method according to claim 1, further comprising:
determining to transmit a confirmation message in response to the authorization message.

7. The method according to claim 1, wherein the operating state is stored in a hardware-based or software-based state machine.

8. The method according to claim 1, wherein the serial bus is operating according to the universal serial bus standard.

9. The method according to claim 1, wherein the predetermined current limit is 2.5 mA.

10. The method according to claim 1, wherein the suspended mode is entered in response to a predetermined suspend condition.

11. A method comprising:
participating in an enumeration process in a message exchange to enable bus communication between a host and a device;
after completing the enumeration process, receiving, on a serial bus, a message indicating a serial bus suspended mode power requirement of the device;
determining by the host whether the suspended mode power requirement can be fulfilled;
causing transmission of an increased power mode enable message if the power requirement can be fulfilled;
determining to provide, while said device is in an increased power suspended mode, sufficient current to allow an increased current drain in accordance with the indicated power requirement.

12. The method according to claim 11, further comprising:
determining to transmit a disable message to the apparatus to indicate that the power requirement cannot be fulfilled any more in suspended mode.

13. A method comprising:
participating in an enumeration process in a message exchange to enable bus communication between a host and a device;
after completing the enumeration process, determining by the device to transmit a message on a serial bus that indicates a serial bus suspended mode power requirement;
receiving the message by the host;
determining, by the host, whether the suspended mode power requirement can be fulfilled;
determining, by the host, to transmit an increased power mode enable message if the power requirement can be fulfilled;
in response to the received power mode enable message, determining, by the device, to set an increased power mode operating state or a normal power mode operating state;
determining to, where the increased power mode operating state is set, enter an increased power suspended mode;
determining to, where the normal power mode operating state is set, enter a normal power suspended mode;
determining to draw, while in the increased power suspended mode, a current in accordance with the indicated power requirement that may exceed a predetermined current limit; and
determining to draw, while in the normal power suspended mode, a current at or below the predetermined current limit.

14. A computer program product comprising computer executable program code recorded on a non-transitory computer-readable storage medium, the computer executable program code comprising:
code for participating in an enumeration process in a message exchange to enable bus communication between a host and a connected device;
code for, after completing the enumeration process, causing determination to transmit a message on a serial bus that indicates a serial bus suspended mode power requirement of the connected device;
code for receiving an authorization message for power;
code for causing determination to set an increased power mode operating state or a normal power mode operating state in response to the received authorization message;
code for causing determination of whether the increased power mode operating state or the normal power mode operating state is set;
code for causing determination to draw, while in the increased power suspended mode, a current in accordance with the indicated power requirement that may exceed a predetermined current limit; and
code for causing determination to draw, while in the normal power suspended mode, a current at or below the predetermined current limit.

15. An apparatus comprising:
a serial bus interface configured to transmit a message that indicates a serial bus suspended mode power requirement;
a processing unit connected to the serial bus interface;
wherein the processing unit is configured to;
participate in an enumeration process in a message exchange to enable bus communication between a host and the apparatus;
after completing the enumeration process, receive an authorization message for power; and determine to set an increased power mode operating state or a normal power mode operating state in response to the received authorization message; and a current limiter configured to limit the current drawn from the serial bus interface in dependence of the operating state, wherein the current limiter is configured to limit current draw, while in the increased power suspended mode, to a current in accordance with the indicated power requirement that may exceed a predetermined current limit, and wherein the current limiter is configured to limit current draw, while in the normal power suspended mode, to a current at or below the predetermined current limit.

16. The apparatus according to claim 15, further comprising a software-based or hardware-based state register configured to indicate the increased power mode operating state or the normal power mode operating state.

17. The apparatus according to claim 15, wherein the processing unit is further configured to determine whether an increased power mode operating state or a normal power mode operating state is set.

18. The apparatus according to claim 15, wherein the processing unit is further configured to enter a suspended mode of the serial bus.

19. The apparatus according to claim 15, wherein the serial bus is operated in accordance with the universal serial bus standard.

20. An apparatus comprising:

a serial bus interface configured to receive a message indicating a serial bus suspended mode power requirement of an a connected device;

a processing unit connected to the serial bus interface;

wherein the processing unit is configured to:

participate in an enumeration process in a message exchange to enable bus communication between the apparatus and the connected device;

after completing the enumeration process, determine whether the suspended mode power requirement can be fulfilled;

cause transmission of an increased power mode enable message if the power requirement can be fulfilled; and a power unit configured to provide, while said connected device is in an increased power suspended mode, sufficient current to allow an increased current drain in accordance with the indicated power requirement.

* * * * *